A. D. CHESEBRO.
Insect-Traps.
No. 134,419. Patented Dec. 31, 1872.
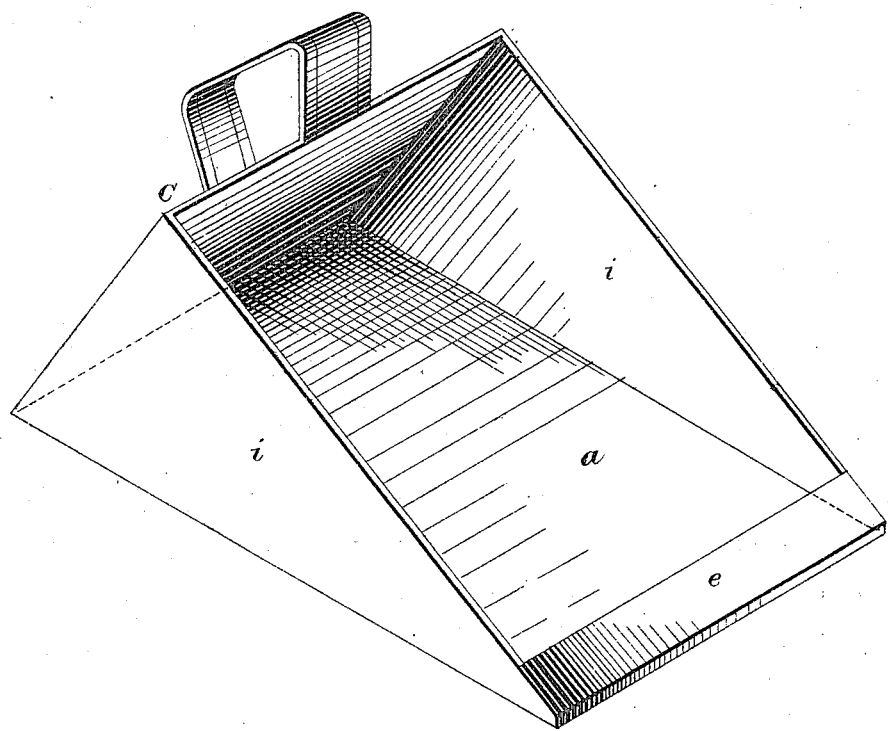
Witnesses
P. R. L. Peirce
Wm. S. Howard
Inventor
Allen D. Chesebro

UNITED STATES PATENT OFFICE.

ALLEN D. CHESEBRO, OF GRAND RAPIDS, MICHIGAN.

IMPROVEMENT IN INSECT-TRAPS.

Specification forming part of Letters Patent No. 134,419, dated December 31, 1872.

*To all whom it may concern:*

Be it known that I, ALLEN D. CHESEBRO, of Grand Rapids, in the county of Kent and State of Michigan, have invented a Metallic Pan in which to catch the Colorado Potato-Bug, or *doryphora decimlineata*, and their larvæ, of which the following is a specification:

It is usually constructed of tin, the bottom being about eighteen inches in length by fourteen inches in width; the back side is about ten by fourteen inches and inclined to the bottom at an angle of about forty-five degrees; the front edge is about one and a half or two inches wide, and inclined to the bottom at an angle of about thirty degrees; the sides are at right angles with the bottom and of a shape to correspond with the back and front, with a handle attached to the upper edge of the back side; reference being had to the annexed drawing.

*Description of the Drawing.*

Figure 1 is a perspective view.

*a* is the bottom of the pan. *c* is the back side of the pan inclined to the bottom, with a handle attached at the top. *e* is the front edge, also inclined at the bottom. *i i* are the sides.

To be operated with, the pan should be taken in one hand and a shingle or brush in the other; place the front edge of the pan at the bottom of the potato-vines and strike them with the shingle, driving the bugs into the pan.

By reason of the peculiar construction of this pan or trap the bugs and larvæ, when forced therein, are held securely until destroyed by heated water or otherwise. It is apparent that for brushing insects from small vines the front part of the pan has peculiar adaptation in consequence of the acute angle upon which it is constructed, and it is also apparent that by the angular recesses formed by the rear wall *c* and the front or lip *e* means of escape from the trap are in great measure cut off.

*Claim.*

The pan or trap herein described, constructed with inclined rear wall *c* and lip *e*, and having bottom *a* and sides *i*, substantially as and for the purpose specified.

ALLEN D. CHESEBRO.

Witnesses:
 WM. G. BECKWITH,
 H. B. DAVIS.